(12) United States Patent
Salmon et al.

(10) Patent No.: US 7,287,258 B1
(45) Date of Patent: Oct. 23, 2007

(54) THREAD CONSISTENCY SUPPORT SYSTEM AND METHOD

(75) Inventors: Glen Salmon, Amesbury, MA (US); John F. Kilroy, Hampton, NH (US)

(73) Assignee: International Business Machines Corporation, Armonk, NY (US)

( * ) Notice: Subject to any disclaimer, the term of this patent is extended or adjusted under 35 U.S.C. 154(b) by 875 days.

(21) Appl. No.: 09/943,673

(22) Filed: Aug. 31, 2001

(51) Int. Cl.
- G06F 3/00 (2006.01)
- G06F 9/44 (2006.01)
- G06F 9/46 (2006.01)
- G06F 13/00 (2006.01)

(52) U.S. Cl. ............... 719/328; 709/227; 709/228; 709/229; 707/10

(58) Field of Classification Search .......... 707/202, 707/10; 719/311, 328; 709/227–229
See application file for complete search history.

(56) References Cited

U.S. PATENT DOCUMENTS

| | | | |
|---|---|---|---|
| 5,596,745 A * | 1/1997 | Lai et al. ........... | 707/103 R |
| 6,112,196 A * | 8/2000 | Zimowski et al. ...... | 707/2 |
| 6,301,676 B1 * | 10/2001 | Kumar et al. ......... | 714/11 |
| 6,314,430 B1 * | 11/2001 | Chang ............. | 707/103 R |
| 6,339,771 B1 * | 1/2002 | Zimowski et al. ...... | 707/2 |
| 6,411,986 B1 * | 6/2002 | Susai et al. ......... | 709/203 |
| 6,434,543 B1 * | 8/2002 | Goldberg et al. ....... | 707/2 |
| 6,801,919 B2 * | 10/2004 | Hunt et al. .......... | 707/202 |

\* cited by examiner

Primary Examiner—William Thomson
Assistant Examiner—Qing-Yuan Wu
(74) Attorney, Agent, or Firm—Dreier LLP (57) ABSTRACT

A thread consistency support system 10 provides thread consistency from a Connector Application Program Interface 50 that creates multiple threads to a Thread-dependent Connector 40 that only allows a single thread to link to that connector for all operations on that connector. The system includes a Detection/Activation routine 20 that activates a Threading MetaConnector routine 30 in response to the Detection/Activation routine identifying a multi-threaded application 60 attempting to access a Thread-dependent Connector 40. The Threading MetaConnector routine 30 interfaces between the Connector Application Program Interface 50 and the Thread-dependent Connector 40. The Threading MetaConnector routine 30 establishes a connection handle for a single internal thread 80 with the Thread-dependent Connector 40 that is returned to the Connector Application Program Interface 50 of a calling multi-threaded application 60 in place of multiple requested thread connection handles. The connection handle is established in response to the Threading MetaConnector routine's receipt of multiple threads 70 from the Connector Application Program Interface 50. The thread consistency support system 10 ensures that the same thread that initializes a connection from the Thread-dependent Connector 40 is used for all subsequent operations attempted by the multiple threads 70 from the application 60 with that connector.

30 Claims, 4 Drawing Sheets

PRIOR ART

FIG. 4

THREAD CONSISTENCY SUPPORT SYSTEM AND METHOD

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

This invention relates generally to software thread management and, more particularly, to a thread connection enhancement to a connector application program interface that provides alternate thread support in the form of thread consistency to connectors.

In computer science terminology, a thread, sometimes shorthand for thread of control, generally represents an execution stream through a software process. Threads can only exist if a process exists. When the process starts, it does all of the required initialization, such as address spacing and the like, which requires use of system resources. Threads allow multiple processes to share the same address space, resources, and so on, while running concurrently. A thread often owns a small or minimal set of resources, including a machine state, a control stack, machine interface (MI) automatic storage, and anchors for thread local storage. Threads share other process resources, such as static and heap storage, program activations, etc., with other threads. A threaded application that makes use of, for example, static storage must synchronize access to that storage among its threads. Neither the programming language, such as C, nor the operating system provides implicit synchronization.

When an application uses more than one thread at a time, it is generally referred to as multi-threading. If an application is saturated, starting a new thread will often help. Starting a new thread is fast and economical, and it thus improves performance versus starting a new process to do the same job. Unlike processes, one advantage of multi-threading is that there are no resource sharing concerns. While applications vary, multi-threading can provide many benefits, such as improved application scalability due to reduced use of resources, superior response time in creating new threads as compared with new processes, and centralized management of client connections in a single server.

However, some back-end systems, that is, external systems like databases or messaging servers, which provide information access via a published interface, are more restrictive and confine operations to that of a single particular thread per connection, or execution instance which uses the published interface to access the back-end system— usually the thread to which the back end has granted a connection handle. This leads to incompatibility problems when a multi-threaded client application seeks to interface with this type of restrictive back end system. The restrictive back-end systems may require completely single threaded server applications that maintain thread consistency. In such systems, multiple threads could still exist in a thread consistent environment, provided that each connection is associated with only one thread. In contrast, a multi-threaded server application requires that the connectors support multi-threading, since the connector APIs of these multi-threaded server applications assume that connections may be used freely between threads, and that each connector supports thread execution without regard to thread consistency.

Thus, this type of restrictive back-end system simply will not support multiple threads from a multi-threaded server application. This is unfortunate since many server applications are multi-threaded, and it is desirable to be able to implement these applications without regard to the back-end system. Accordingly, there is a need for a system that allows a multi-threaded server application to interface with a restrictive back-end system that requires thread consistency. The present invention fulfills this and other needs.

SUMMARY OF THE INVENTION

The above and other needs are addressed by a method in accordance with the present invention for interfacing between a multi-threaded client application and a restrictive back-end processing system through a thread-dependent connector which generates connections requiring single threads. The method includes detecting a thread-dependent connection request to a back-end processing system, maintaining a single thread to link to the detected thread-dependent connection such as by mapping each of the multiple threads with the single thread, and correlating multiple threads from the application with the maintained single thread. The method funnels operation requests by multiple application threads through the thread-dependent connection's dedicated thread to the back-end processing system. In some embodiments, detecting a thread-dependent connection involves detecting an attempt by the application to access the back-end processing system and then querying the connector to see if it requires single-threaded access to the back end. This may be accomplished by reading a header data structure for the connector which stores data identifying the properties of the given connector including information about its thread dependencies. For example, the header data structure may contain a flag indicating whether the connector supports multiple threads per connection. Alternatively, the thread-dependent connection is detected by detecting a connector allocating memory for an instance of a connection.

In some embodiments, maintaining a single thread involves allocating a thread from the application and isolating it as the single thread to link to the connection handle granted by a back-end system. For back-end systems which support multiple simultaneous connections but still require correlation between each connection and its application thread, the method may further involve detecting a second thread-dependent connection request to the back-end processing system, maintaining a second single thread to link to the detected second thread-dependent connection to the back-end system, and correlating one or more threads from the application with the maintained second single thread. This allows additional operations requested by the application over the second thread(s) to be performed on the back-end processing system through the second thread-dependent connection.

Multiple threads from the application may be correlated by generating a thread support object to support relationships between the multiple threads and the maintained single thread and using the thread support object to toggle execution of an operation between one of the multiple threads and the maintained single thread. The thread support object may contain two or more semaphores which would be used to toggle execution of the operation between one of the multiple threads and the maintained single thread.

The need described above is also addressed by a thread consistency support system of the present invention that produces thread consistency between a multi-threaded application and a thread-dependent connector. The system includes an arbiter or interface layer positioned between the application and the thread-dependent connector. The thread-dependent connector only allows a single thread to link to that connector for all operations on that connector. The multi-threaded application creates multiple threads that attempt to access the thread-dependent connector. The arbiter layer receives requests from the multiple application threads and channels them through a single internal thread associated with the connector, upon which operations of the multiple application threads are performed.

In one embodiment of the present invention, the thread consistency support system further includes an activation detector that activates the arbiter layer in response to the detection of an attempted access to a restrictive back end system which would generate a thread-dependent connector. The activation detector may be an enhancement incorporated into a connector application program interface. In some embodiments the system is configured to channel multiple threads from a multi-threaded application to more than one thread-dependent connector.

In one embodiment of the present invention, the thread consistency support system channels the multiple threads from the application to an isolated, single thread associated with the thread-dependent connector. The thread consistency support system may execute a thread isolation routine to channel the multiple threads from the application into a single internal thread. In one embodiment, the thread consistency support system utilizes threading in connection with a toggle algorithm to isolate thread execution and channel the multiple threads from the application into a single internal thread.

In another aspect of a thread consistency support system constructed in accordance with the present invention, the single internal thread produced by the arbiter layer acts as a thread sub-connection to the thread-dependent connector that is assigned to each of the original multiple thread connections from the application to the arbiter layer. The thread consistency support system may utilize connector methods that appear to the application to be those of the underlying sub-connected thread-dependent connector. In one embodiment, the thread consistency support system isolates a single thread of the sub-connection for use in operations of the back-end system and for interacting with and responding to requests from the multi-threaded application.

In still another embodiment of the present invention, the thread consistency support system includes a threading meta-connector interacting between the connector application program interface and the thread-dependent connector. The threading meta-connector establishes a connection handle for a single internal thread with the thread-dependent connector that is returned to the connector application program interface of a calling application in place of multiple requested thread connection handles. The connection handle is established in response to the threading meta-connector's receipt of a request to allocate a connection to a restrictive back-end system. The same thread that initializes a connection from the thread-dependent connector is then used for some or all subsequent operations attempted by the multiple threads from the application with that connector.

A method for providing thread consistency according to the present invention includes receiving a request to connect to a restrictive back-end system, creating a single thread connection with a thread-dependent connector of the back-end system, and utilizing the single thread connection with the thread-dependent connector for the multiple threads from the connector application program interface to channel operations to be performed by the multiple threads therethrough.

Other features and advantages of the present invention will become apparent from the following detailed description, taken in conjunction with the accompanying drawings, which illustrates by way of example, the features of the present invention.

DETAILED DESCRIPTION OF THE PREFERRED EMBODIMENTS

A thread consistency support system constructed in accordance with embodiments of the present invention provides an interface layer between a multi-threaded application written to a Connector Application Program Interface (API) and an individual connector in a restrictive back-end system. As described further below, the interface layer maps the application's multiple threads to the internal thread(s) of the thread consistency support system in order to preserve thread consistency by, for example, maintaining one thread per connection.

Figure 1:
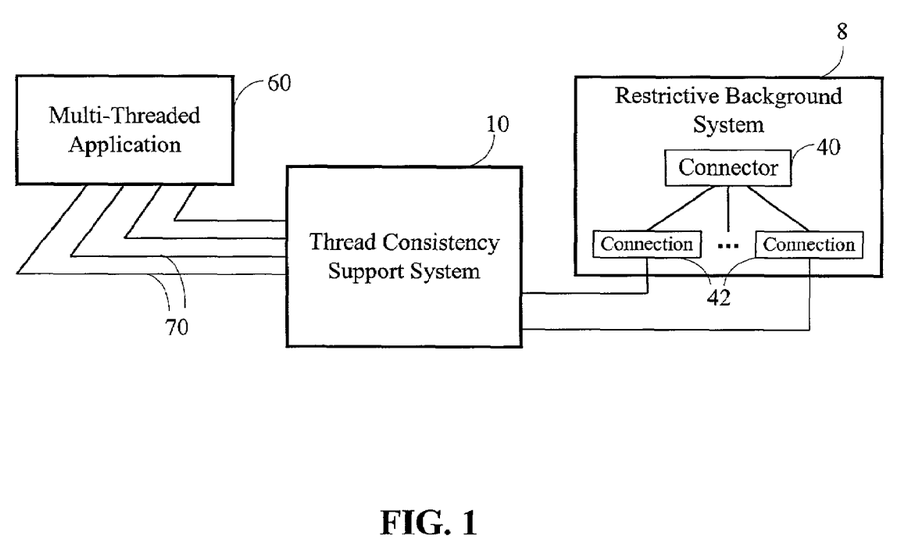
FIG. 1 illustrates a thread consistency support system of the present invention interfacing with an application and a restrictive back-end processing system.

Referring now to the drawings, and more particularly to FIG. 1, a thread consistency support system 10 is provided to interface between a multi-threaded application and a restrictive back-end processing system 8. The multi-threaded application 60 handles processing of its operations through multiple simultaneous processing or software threads 70, as known to those of skill in the art. The back-end processing system 8 is restrictive in that it contains a connector 40 which is thread-dependent and generates instances of connections 42 which each process only a single thread at a time. The thread consistency support system 10 detects the a request made to a restrictive back-end system with the thread dependency and correlates the multiple threads 70 with each single thread 80 for each connection instance 42.

Figure 2:
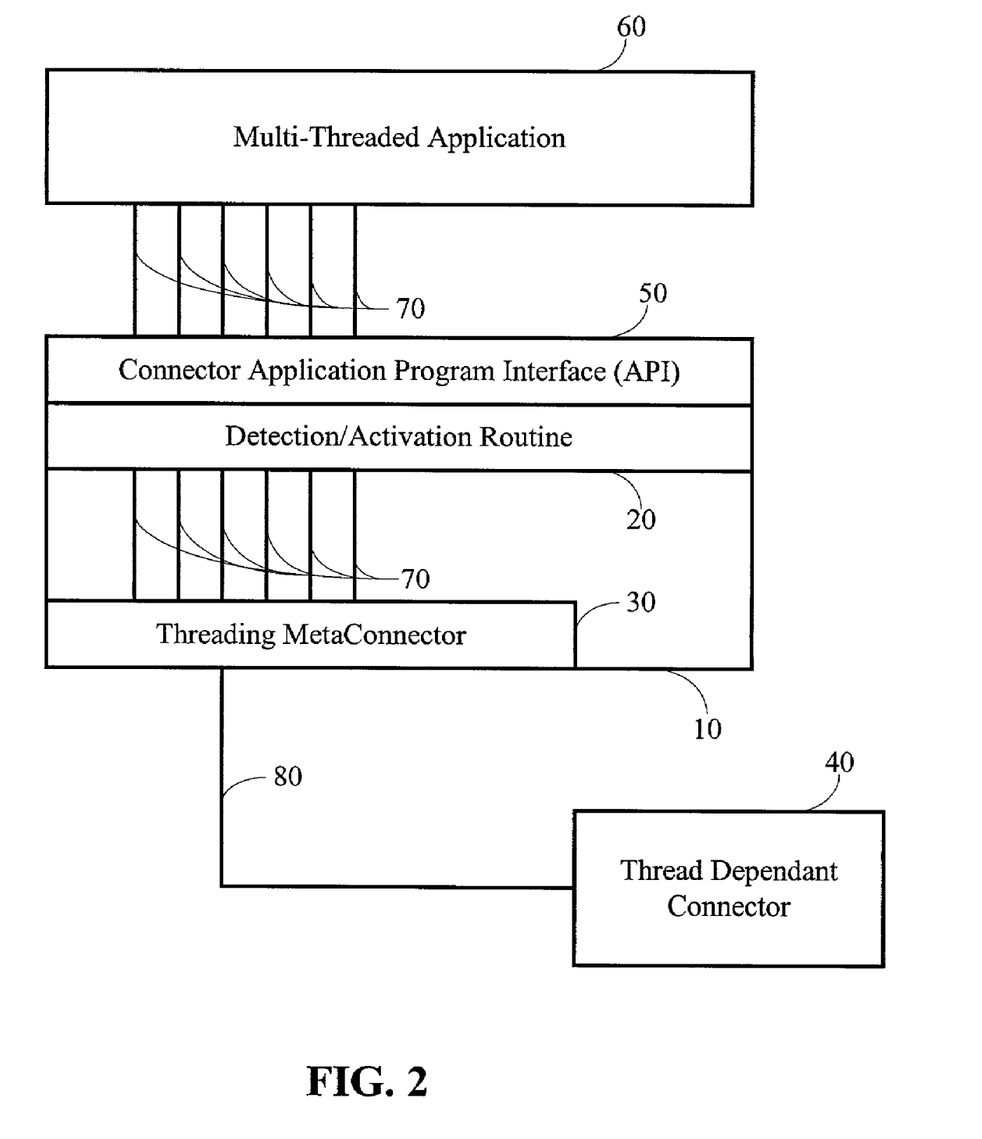
FIG. 2 illustrates in more detail one embodiment of the thread consistency support system.

Referring now to an embodiment of the present invention as shown in FIG. 2, a thread consistency support system 10 includes a Detection/Activation routine 20 and a Threading MetaConnector routine 30. The Detection/Activation routine 20 is configured to determine if thread consistency is required. If thread consistency is required, the Detection/Activation routine 20 activates the Threading MetaConnector routine 30 in response to detection of an application attempting to access a restrictive back-end system that uses connectors requiring single threads. The Threading Meta-Connector routine 30 is configured to receive multiple incoming application threads 70 from a Connector API 50 and channel the multiple application threads 70 into a single internal thread 80 that is maintained from the thread consistency support system 10 to the connector 40 until the all data operations of the multiple application threads 70 are complete. The Threading MetaConnector routine 30 only allows a single thread to link to a given connector 40 for all operations on that connector.

The Threading MetaConnector routine 30 interfaces between the Connector Application Program Interface 50 and the Thread-dependent Connector 40. The Threading MetaConnector routine 30 isolates a single internal thread for the Thread-dependent Connector. In this manner, thread consistency support system 10 ensures that the same thread that initializes a connection with the Thread-dependent Connector is used for all subsequent operations attempted by the multiple threads 70 from the application 60 with that connector 40. The thread consistency support system 10 of the present invention implements a level of indirection between an application's threads 70 to the one or more connectors 40 and internal threads 80. This involves mapping the application's threads 70 to the internal threads 80 in order to preserve one thread per connection.

In one embodiment, the Connector API 50 is the Lotus Connector API, and the individual connector 40 is the Lotus Domino Connector. The thread consistency support system 10 is only active for connectors which require thread consistency. Connectors requiring support from the thread consistency support system 10 are identified as such through a list of supported threads contained in a header block of the connector 40. When a connector 40 identifies the need for this thread consistency support that is provided by the present invention, the Lotus Connector API automatically activates the thread consistency support system 10 in order to isolate application threads 70 from the internal threads 80 running through the connector 40.

In one embodiment, the Detection/Activation routine 20 may be implemented as an enhancement or extension to a connection allocation function of a Connector API 50, such as the Lotus Connector (LC) Connection Allocation function LCConnectionAlloc( ) of the Lotus Connector API 50, while the Threading MetaConnector 30 may be entirely new code. The Detection/Activation routine 20 would then be written in the same programming language as the connection allocator function, such as the C programming language. The Threading MetaConnector 30, if implemented as entirely new code, may be written in a different programming language, such as C++ or other languages as known to those of skill in the art.

In a preferred embodiment of the present invention, the thread consistency support system 10 is supported by the following platforms which are listed by way of example only, and not by way of limitation: Windows 2000, Windows NT 4.0, Windows 95, Windows 98, OS/2 Warp 4.0, AIX 4.3.1, Solarius SPARC2.5, HP-UX 11.0, Linux, AS/400, S/390.

Referring now to the Detection/Activation routine 20 of the thread consistency support system 10 (which enhances the abilities of the Connector API 50), in one embodiment of the present invention the Connector API loads a connector as part of the Connection Allocation routine. At load time, the Connector Identity function is called to gather information about the Connector and what support the Connector provides, including whether the connector supports multi-threading. The connector's thread support is part of the identification data in the connector's header block. When queried by the API at load time, the connector provides a list of supported threads. If a requested thread is not in this list, the API interrogates the connector to determine if it will support the thread.

In one embodiment of the present invention, the thread consistency support system 10 uses a flag, called the Identify Context Thread, that is created within the identification structure in the connector's header. This flag indicates whether the connector requires special handling of threads and is a Thread-dependent Connector 40. The flag indicates whether the connector 40 requires that the same thread which initializes the connection must be used for all subsequent operations on that connection. The flag does not indicate the connector is single-threaded, since multiple threads may exist when multiple connections are active at one time. That is, the connections, which are instances of the connector, may be limited to single thread access while the connector is capable of generating additional instances of connections to handle multiple threads.

In an embodiment of the present invention, when a multi-threaded application 60 calls the Connection Allocation routine to load a connector 40, the thread consistency support system 10 tests the connector's thread information. If the Identify Context Thread flag is set, the thread connector code system 10 calls the Connection Allocation routine to load and initialize the Threading MetaConnector 30. Once the Threading MetaConnector 30 has been created, the original connection is assigned as the Threading MetaConnector's sub-connection. Thus, the connection handle for the Threading MetaConnector 30 is returned to the calling multi-threaded application 60 in place of the requested connection handle. In order to maintain transparency, the Threading MetaConnector 30 reports back the sub-connector's responses (those of the Thread-dependent Connector 40) for all properties including a token connector name. Additionally, the connector's methods appear as those of the underlying sub-connector.

Referring now more specifically to the Threading MetaConnector 30 portion of the present invention, the Threading MetaConnector 30 receives calls from the Connector API 50 and passes those calls on to the Thread-dependent Connector 40. The Connector API 50 may receive calls from multiple threads to a single connection, whereas the Threading MetaConnector 30 creates and uses one thread for the duration of each connection.

In one particular embodiment of the present invention, the Threading MetaConnector 30 allocates a block of memory and creates a context object when a new connection is initialized. This is similar to the function performed generally by connectors and metaconnectors. As part of the context object, the Threading MetaConnector 30 maintains both the handle of the Thread-dependent Connector 40 and a Thread Support Object (TSO). The Thread Support Object consists of two semaphores, a data passing structure, and a thread executing within a message processing routine. In this implementation of the present invention, the thread consistency support system 10 uses threading in connection with a toggle algorithm to isolate thread execution. By utilizing two semaphores, execution toggles between the thread executing from the application and from the Thread Support Object's thread. In the portion of the thread consistency support system 10 that executes the toggling between the application code and the Thread Support Object, a Connector Initialize routine and a Connector Terminate routine are responsible for configuration and cleanup of the Thread Support Object. In one embodiment, remaining connector methods, with the exception of the Connector Identify routine, are processed through the Thread Support Object. Briefly stated, the application code threads 70 run from the multi-threaded application 60 through the Connector API 50 and into the Threading MetaConnector 30, while the Thread Support Object thread runs inside the Thread Support Object processing routine.

The Threading MetaConnector's context block contains elements for the Thread-dependent Connector's connection handle as well as the data passing structure. A pointer to the context block is passed when the Thread Support Object's thread is first created on the processing routine. In one embodiment, the data passing structure contains the union of all parameters which are used as input and output from the methods of the Connector API 50. In this embodiment, various methods are utilized by the Connector API for connectors and meta-connectors. The methods support a variety of connector functions including identifying the connector to the API, performing initialization and termination of a connection, fetching or setting connector property values and data provider records, handling metadata, and performing other desired actions. For example, the Lotus Connector API has a published interface to the connector which supports seventeen methods for any connector or meta-connector. Not all methods are supported by all connectors; however, each is implemented and may return a value of unavailable when not supported.

In one embodiment of the present invention, the Threading MetaConnector 30 has specific code associated with initialization and termination. For all remaining functional methods, the Threading MetaConnector 30 performs parameter loading and unloading, as well as thread toggling. Examples of individual methods for specific embodiments are outlined below in conjunction with details for specific methods, as well as generic method processing.

For example, in the implementation of the present invention in the Lotus Connector API, LCX Identify is a method called when the Threading MetaConnector 30 is loaded. The LCX Identify method returns the MetaConnector's LCX identifying structure. The LCX identifying structure indicates levels of threading support as well as the size of the context block required. The context block contains internal data elements as well as the parameter passing structure for the Thread Support Object for the Lotus Connector methods. Minimal data structures are required for the Thread Support Object parameters in the context block. Additional data elements may also be added as desired.

Another method in this implementation is the LCX Initialize method, which performs internal initialization specific to the current thread, including initialization of the context block. Additionally, if a Process flag is set, this method additionally performs MetaConnector initialization specific to the entire process. Once the context block is initialized, any optional general purpose stream object that exists, which may be part of the context block, is cleared. Additional objects may also be stored in the context block for optimization purposes. Any such objects would also be initialized at this time. As part of the context block, the Thread Support Object is initialized, including the parameter structure and the semaphores necessary for toggling execution of the Thread Support Object processing routine. Moreover, the Thread Support Object thread is spawned on its processing routine. The processing routine initializes any internal data and then waits for the processing request. The context block may be initialized by using a memory set routine to initialize all bytes to zero and then set any non-zero elements to the their initial values.

Another method is a LCX Terminate method, which performs the termination specific to the current thread. If the Process flag is set, this method additionally performs the termination specific to the entire process. Preferably, a Lotus Connector Method ID of the Thread Support Object is set to Terminate ID, and input parameters are loaded into the parameter structure of the context block for the Thread-dependent Connector's LCX Terminate method. In addition to calling the Connection Terminate routine with the Thread-dependent Connector handle, the Thread Support Object performs its internal clean-up and then exits the process routine, thereby terminating the Thread Support Object thread. The Threading MetaConnector 30 cleans up the Thread Support Object including closing the semaphores. If the context block contains additional objects, such as a general purpose stream or allocated buffers, these are freed and cleaned up at this point.

Figure 3:
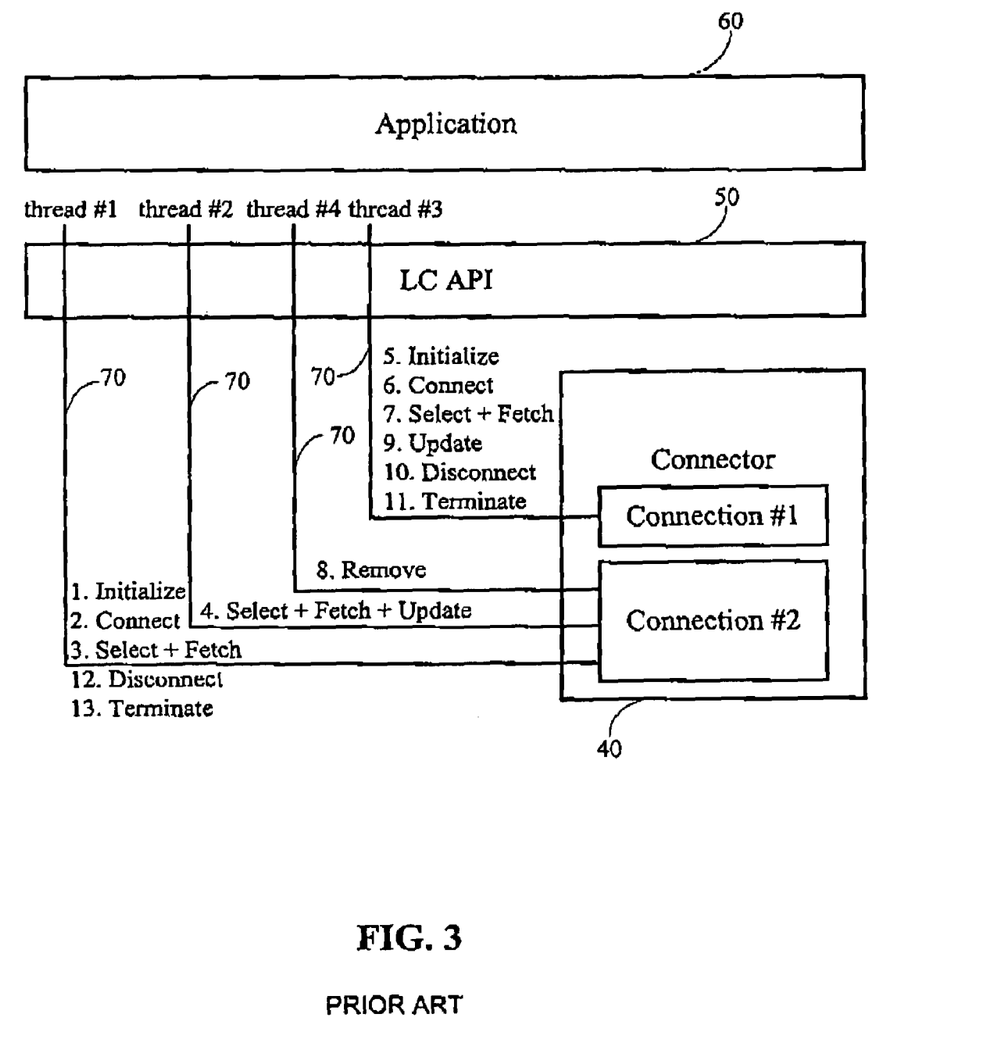
FIG. 3 illustrates a multi-threaded application using conventional thread support to interface with a thread-dependent connector.
Figure 4:
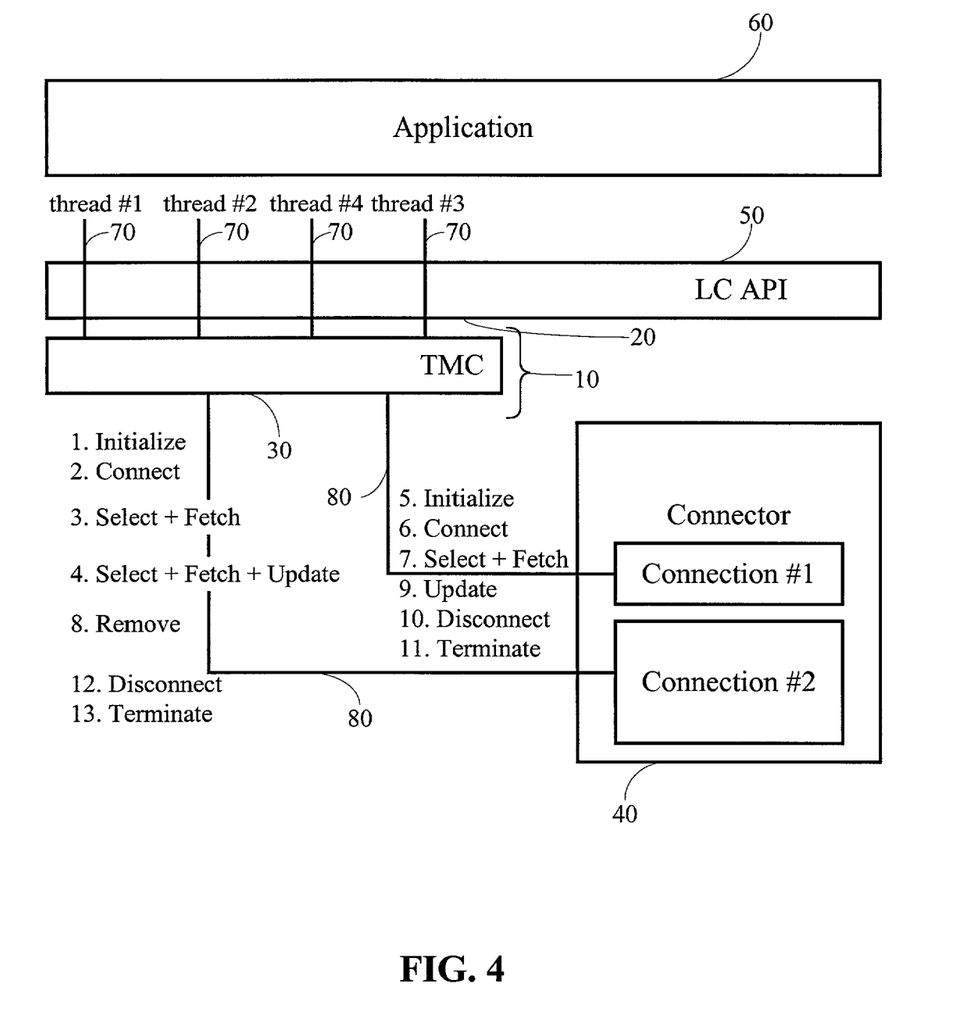
FIG. 4 illustrates an exemplary use of the thread consistency support system of the present invention to interface between a multi-threaded application and a thread-dependent connector.

Referring now to FIGS. 3 and 4, an illustrative example of the thread consistency support provided by an embodiment of a thread consistency support system 10 of the present invention is demonstrated. In the example depicted in FIGS. 3 and 4, a multi-threaded application 60 is shown which has four threads 70. Three of the threads share a common connection and perform a number of data operations. The remaining thread has a separate connection and performs all of its own data operations. FIG. 3 represents a Connector API 50 utilizing conventional thread support. In contrast, FIG. 4 represents the implementation of an embodiment of the present invention with the Connector API 50 utilizing the thread consistency support system 10 in order to maintain thread consistency.

Referring again to the example of FIG. 3, where the Connector API 50 uses conventional thread support, the first thread establishes a new connection, initializes the connection, and then selects and fetches data. A second thread is then created which uses the existing connection to select, fetch, and then update data. A third thread then establishes a new connection, initializes and connects, and then selects and fetches data. Later, the third thread updates the data and then disconnects and terminates the connection. While the third thread is still active, a fourth thread uses the first connection to remove data.

Referring now to FIG. 4, where the Connector API 50 utilizes the thread consistency support system 10 of the present invention, the example begins with the first thread trying to establish a new connection with a restrictive back-end system. The thread consistency support system 10, and in particular the TMC 30, isolates the connection from the requesting thread 70. The TMC 30 then creates its own thread 80 and uses this internal thread to create the new connection. The TMC 30 maintains a correlation between its internal thread 80 and the connection handle. The application's first thread initializes and connects to the connection. Each call from the application 60 to the connection 40 goes through the thread consistency support system 10 which takes the connection handle and uses it to find its own internal thread 80, which is dedicated to the connection 40. The application thread 70 selects and fetches data. Again, the thread consistency support system 10 uses the connection handle to identify its own internal thread 80 and uses the internal thread when interacting with the connection 40.

A second thread 70 is then created by the multi-threaded application 60 which uses the existing connection to select, fetch, and then update data. The TMC 30 identifies its first internal thread 80 as matching the connection handle. A third application thread 70 establishes a new connection. The thread consistency support system 10 creates another internal thread 80 to correspond to the new connection. The application's third thread 70 initializes and connects, and then selects and fetches data through this second internal thread 80. The TMC 30 identifies its second internal thread 80 as matching the connection handle which is then used to complete the data access. A fourth application thread 70 uses the first connection to remove data. The TMC 30, using the connection handle for the first connection, identifies its first internal thread 80 to complete the operation. Later, the application's third thread 70 updates and then disconnects and terminates the connection. The TMC 30 identifies its second internal thread 80 as corresponding to the connection handle and then uses it as necessary. In a more detailed example of the use of the present invention, throughout this process, the individual application threads may perform additional data operations.

The various methodologies described above are provided by way of illustration only and should not be construed to limit the invention. Those skilled in the art will readily recognize various modifications and changes may be made to the present invention without departing from the true spirit and scope of the present invention. Accordingly, it is not intended that the invention be limited, except as by the appended claims.

What is claimed is:

1. A method for interfacing between a multi-threaded application and a restrictive back-end processing system, wherein the back-end processing system requires a thread-dependent connection where a relationship between a connection and an application thread is maintained, the method comprising:

detecting the thread-dependent connection in the back-end processing system;

maintaining a single thread to link to the detected thread-dependent connection by mapping each of multiple threads from the multi-threaded application with the single thread;

correlating each of the multiple threads from the multi-threaded application with the maintained single thread;

performing operations requested by the multi-threaded application over the multiple threads on the back-end processing system through the thread-dependent connection.

2. The method of claim 1, wherein detecting a thread-dependent connection comprises detecting the multi-threaded application attempting to access the back-end processing system.

3. The method of claim 1, wherein the thread-dependent connection allocates memory for connection instances, and wherein detecting a thread-dependent connection comprises detecting the thread-dependent connection allocating memory for a connection instance.

4. The method of claim 1, wherein detecting a thread-dependent connection comprises reading a header data structure for the thread-dependent connection, the header data structure storing identification data including data identifying thread requirements of the thread-dependent connection.

5. The method of claim 4, wherein reading a header data structure for the thread-dependent connection comprises reading a flag in the header data structure, the flag indicating whether the thread-dependent connection support multiple threads per connection.

6. The method of claim 1, wherein maintaining a single thread comprises receiving a thread from the multi-threaded application and isolating the single thread as the single thread to link to the connection.

7. The method of claim 1, wherein the thread-dependent connection is configured to generate a plurality of simultaneous connections, comprising:

detecting a second thread-dependent connection in the back-end processing system;

maintaining a second single thread to link to the detected second thread-dependent connection; and correlating one or more second threads from the multi-threaded application with the maintained second single thread, thereby allowing additional operations requested by the multi-threaded application over the one or more second threads to be performed on the back-end processing system through the second thread-dependent connection.

8. The method of claim 1, wherein correlating multiple threads from the multi-threaded application comprises generating a thread support object to support relationships between the multiple threads and the maintained single thread and using the thread support object to toggle execution of an operation between one of the multiple threads and the maintained single thread.

9. The method of claim 8, wherein the thread support object comprises two or more semaphores, and comprising using the two or more semaphores to toggle execution of the operation between one of the multiple threads and the maintained single thread.

10. A method of providing thread consistency from a connector application program interface that creates multiple threads to a thread-dependent connector that only allows a single thread to link to that thread-dependent connector for all operations on that thread-dependent connector, the method comprising:

receiving multiple application threads from the connector application program interface, the multiple application threads attempting to access the thread-dependent connector;

creating a single internal thread that links with the thread-dependent connector by mapping each of the multiple application threads with the single thread; and performing data operations of the multiple application threads from the connector application program interface over the single internal thread link with the thread-dependent connector.

11. A thread consistency support system for providing thread consistency between a multi-threaded application and a thread-dependent connector allocated in a restrictive back-end system, wherein the thread-dependent connector only supports a single thread to link to that connector for operations on the thread-dependent connector, and wherein the multi-threaded application creates multiple threads that attempt to access the connector, the system comprising at least one processing device operative to provide:

an arbiter layer positioned between the multi-threaded application and the thread-dependent connector, the arbiter layer being configured to receive multiple threads from the multi-threaded application and to produce a single internal thread by mapping each of the multiple threads from the arbiter layer to the thread-dependent connector upon which operations of each of the multiple threads are performed; and an activation detector that activates the arbiter layer in response to the activation detector detecting a multi-threaded application attempting to access the restrictive back-end system.

12. The system of claim 11, wherein the activation detector is an enhancement incorporated into a connector application program interface.

13. The system of claim 11, wherein the arbiter layer channels the multiple threads from the multi-threaded application through the single internal thread by mapping the threads to preserve one thread per thread-dependent connector.

14. The system of claim 11, comprising a thread isolation routine for isolating a thread from the multiple threads of the multi-threaded application to the single internal thread for linking to a thread-dependent connection.

15. The system of claim 11, comprising a toggle routine channels the multiple threads from the multi-threaded application to produce the single internal thread by using threading in connection with to isolate thread execution.

16. The system of claim 11, wherein the single internal thread produced by the arbiter layer acts as a thread sub-connection to the thread-dependent connector that is assigned to each original multiple thread connection from the multi-threaded application to the arbiter layer.

17. The system of claim 16, wherein the thread consistency support system utilizes connector methods, and wherein the connector methods appear to the multi-threaded application to be those of the underlying sub-connected thread-dependent connector.

18. The system of claim 11, wherein the system establishes a connection handle for the single internal thread with the thread-dependent connector that is returned to a connector application program interface of a calling application, and wherein the thread consistency support system utilizes the connection handle to identify and employ the single internal thread when interacting with the thread-dependent connector in response to requests from the multi-threaded application.

19. The system of claim 11, wherein the system is configured to channel multiple threads from the multi-threaded application to more than one thread-dependent connector.

20. A thread consistency support system for providing thread consistency from a connector application program interface that creates multiple threads to a thread-dependent connector that only allows a single thread to link to that thread-dependent connector for all operations on that thread-dependent connector by mapping each of the multiple threads to the single thread, the system comprising at least one processing device operative to provide:
  a threading meta-connector interacting between the connector application program interface and the thread-dependent connector, wherein the threading meta-connector establishes a connection handle for a single internal thread with the thread-dependent connector that is returned to the connector application program interface of a calling multi-threaded application in place of connection handles requested for multiple application threads, in response to the threading meta-connector's receipt of multiple application threads from the connector application program interface; and
  an activation detector that activates the threading meta-connector in response to the activation detector identifying a multi-threaded application attempting to access a thread-dependent connector;
  thereby ensuring that the single internal thread that initializes a connection from the thread-dependent connector is used for all subsequent operations attempted by the multiple application threads from the multi-threaded application to that thread-dependent connector.

21. A computer-readable storing medium, comprising:
  a set of instructions, the set of instructions capable of being executed by a processing arrangement to implement a method for interfacing between a multi-threaded application and a restrictive back-end processing system, the back-end processing system requires a thread-dependent connection where a relationship between a connection and an application thread is maintained, the set of instructions effective to perform the steps of:
  detecting the thread-dependent connection in the back-end processing system;
  maintaining a single thread to link to the detected thread-dependent connection by mapping each of multiple threads from the multi-threaded application with the single thread; and
  correlating each of the multiple threads from the multi-threaded application with the maintained single thread, thereby allowing operations requested by the multi-threaded application over the multiple threads to be performed on the back-end processing system through the thread-dependent connection.

22. The computer-readable storing medium of claim 21, wherein detecting a thread-dependent connection comprises detecting the multi-threaded application attempting to access the back-end processing system.

23. The computer-readable storing medium of claim 21, wherein the thread-dependent connection allocates memory for connection instances, and wherein detecting a thread-dependent connection comprises detecting the thread-dependent connection allocating memory for a connection instance.

24. The computer-readable storing medium of claim 21, wherein detecting a thread-dependent connection comprises reading a header data structure for the thread-dependent connection, the header data structure storing identification data including data identifying thread requirements of the thread-dependent connection.

25. The computer-readable storing medium of claim 24, wherein reading a header data structure for the thread-dependent connection comprises reading a flag in the header data structure, the flag indicating whether the thread-dependent connection support multiple threads per connection.

26. The computer-readable storing medium of claim 21, wherein maintaining a single thread comprises receiving a thread from the multi-threaded application and isolating the single thread as the single thread to link to the connection.

27. The computer-readable storing medium of claim 21, wherein the thread-dependent connection is configured to generate a plurality of simultaneous connections, comprising:
  detecting a second thread-dependent connection in the back-end processing system;
  maintaining a second single thread to link to the detected second thread-dependent connection; and
  correlating one or more second threads from the multi-threaded application with the maintained second single thread, thereby allowing additional operations requested by the multi-threaded application over the one or more second threads to be performed on the back-end processing system through the second thread-dependent connection.

28. The computer-readable storing medium of claim 21, wherein correlating multiple threads from the multi-threaded application comprises generating a thread support object to support relationships between the multiple threads and the maintained single thread and using the thread support object to toggle execution of an operation between one of the multiple threads and the maintained single thread.

29. The computer-readable storing medium of claim 28, wherein the thread support object comprises two or more semaphores, and comprising using the two or more semaphores to toggle execution of the operation between one of the multiple threads and the maintained single thread.

30. A computer-readable storing medium, comprising:
a set of instructions, the set of instructions capable of being executed by a processing arrangement to implement a method of providing thread consistency from a connector application program interface that creates multiple threads to a thread-dependent connector that only allows a single thread to link to that thread-dependent connector for all operations on that connector, the set of instructions effective to perform the steps of:

receiving multiple application threads from the connector application program interface, the multiple application threads attempting to access the thread-dependent connector;

creating a single internal thread that links with the thread-dependent connector by mapping each of the multiple application threads with the single thread; and performing data operations of the multiple application threads from the connector application program interface over the single internal thread link with the thread-dependent connector.

* * * * *